(12) United States Patent
Mese et al.

(10) Patent No.: US 11,647,060 B1
(45) Date of Patent: May 9, 2023

(54) USE OF AUDIO AND IMAGE DATA OF VIDEO CONFERENCE TO DYNAMICALLY GENERATE INTERACTIVE GRAPHICAL ELEMENTS

(71) Applicant: Lenovo (United States) Inc., Morrisville, NC (US)

(72) Inventors: John C. Mese, Cary, NC (US); Nathan Peterson, Oxford, NC (US); Arnold Weksler, Raleigh, NC (US); Mark Delaney, Raleigh, NC (US); Russell Speight VanBlon, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/697,300

(22) Filed: Mar. 17, 2022

(51) Int. Cl.
| | | |
|---|---|---|
| *H04L 65/401* | (2022.01) | |
| *G06F 40/205* | (2020.01) | |
| *G06F 3/0482* | (2013.01) | |
| *G06V 30/10* | (2022.01) | |
| *G06V 30/40* | (2022.01) | |
| *G06F 9/451* | (2018.01) | |
| *G10L 15/18* | (2013.01) | |
| *G10L 25/57* | (2013.01) | |
| *G10L 15/22* | (2006.01) | |
| *H04L 65/403* | (2022.01) | |
| *G06F 3/14* | (2006.01) | |

(52) U.S. Cl.
CPC ........ *H04L 65/4015* (2013.01); *G06F 3/0482* (2013.01); *G06F 3/1454* (2013.01); *G06F 9/451* (2018.02); *G06F 40/205* (2020.01); *G06V 30/10* (2022.01); *G06V 30/40* (2022.01); *G10L 15/1822* (2013.01); *G10L 15/22* (2013.01); *G10L 25/57* (2013.01); *H04L 65/403* (2013.01)

(58) Field of Classification Search
CPC ...... G06F 3/0482; G06F 3/1454; G06F 9/451; G06F 40/205; G06V 30/10; G06V 30/40; G10L 15/1822; G10L 15/22; G10L 25/57; H04L 65/4015; H04L 65/403
See application file for complete search history.

(56) References Cited

U.S. PATENT DOCUMENTS

| | | | |
|---|---|---|---|
| 9,363,092 B2 * | 6/2016 | Crawley | H04L 12/1827 |
| 11,297,281 B1 * | 4/2022 | Agrawal | H04L 12/1822 |
| 2008/0136898 A1 * | 6/2008 | Eisenberg | H04N 7/152 |
| | | | 348/E7.083 |
| 2016/0134668 A1 * | 5/2016 | Shetty | H04M 3/568 |
| | | | 370/260 |
| 2018/0054596 A1 * | 2/2018 | Gwock | H04N 5/343 |
| 2020/0396416 A1 * | 12/2020 | Jaynes | G06F 16/955 |
| 2021/0065203 A1 * | 3/2021 | Billigmeier | G06N 20/00 |

* cited by examiner

*Primary Examiner* — Seth A Silverman
(74) *Attorney, Agent, or Firm* — John M. Rogitz; John L. Rogitz (57) ABSTRACT

In one aspect, a device may include at least one processor and storage accessible to the at least one processor. The storage may include instructions executable by the at least one processor to parse data related to a video conference, with the data including audio data and/or image data for the video conference. Based on the parsing, the instructions may be executable to dynamically generate an interactive graphical element based on content of the audio and/or image data and then control one or more displays to present the interactive graphical element.

20 Claims, 7 Drawing Sheets

USE OF AUDIO AND IMAGE DATA OF VIDEO CONFERENCE TO DYNAMICALLY GENERATE INTERACTIVE GRAPHICAL ELEMENTS

FIELD

The disclosure below relates to technically inventive, non-routine solutions that are necessarily rooted in computer technology and that produce concrete technical improvements. In particular, the disclosure below relates to techniques for using audio and image data of a video conference to dynamically generate interactive graphical elements.

BACKGROUND

As recognized herein, electronic video conferences present a unique set of issues that do not necessarily occur with in-person conferences. As further recognized herein, current electronic video conferencing systems also lack the ability to enhance a video conference with additional technical capabilities that the disclosure below recognizes are possible.

SUMMARY

Accordingly, in one aspect a device includes at least one processor and storage accessible to the at least one processor. The storage includes instructions executable by the at least one processor to parse data related to a video conference, where the data includes audio data for the video conference and/or image data for the video conference. The instructions are also executable to present a graphical element on at least one display based on the parsing, with the graphical element generated based the audio data and/or the image data.

In some examples, the audio data may include a transcript of speech of at least part of the video conference and/or audio of at least part of the video conference. So, for example, the instructions may be executable to use natural language processing (NLP) to parse the transcript and/or the audio.

Also in some example implementations, the graphical element may include an interactive poll with at least two selectable options, where the interactive poll may be dynamically-generated by the at least one processor based on the audio data indicating a first participant audibly presenting a choice to at least second and third participants so that the interactive poll reflects the choice. The choice might be a binary choice, and the interactive poll may include two options reflecting the binary choice. Still further, if desired in some implementations the instructions may be executable to present a prompt to the first participant to present the interactive poll to the second and third participants, receive user input directed to the prompt to present the interactive poll to the second and third participants, and then present the interactive poll to the second and third participants via respective displays for the second and third participants responsive to receipt of the user input. In certain examples, the prompt may even include the interactive poll itself. But also in certain example implementations, the instructions may be executable to present the interactive poll to the second and third participants without the first participant providing additional consent to present the interactive poll beyond audibly presenting the choice.

In addition to or in lieu of the foregoing, the image data may include one or more images associated with the video conference, where the one or more images may be presented to participants of the video conference as part of video for the video conference. Thus, the graphical element may include an interactive poll with at least two selectable options. The interactive poll may be dynamically-generated by the at least one processor based on the one or more images indicating at least two choices to reflect in the interactive poll. In certain examples, the at least one processor may dynamically-generate the interactive poll based on execution of optical character recognition (OCR) using the one or more images to identify text from the one or more images, and based on execution of natural language processing (NLP) to process the text to generate at least one of the selectable options.

Still further, note that in some example embodiments the device may include the at least one display. Also in some example embodiments, the device may include a server facilitating the video conference and/or a client device being used to participate in the video conference.

In another aspect, a method includes processing, using at least one device, data related to a video conference. The data includes audio data associated with the video conference and/or image data associated with the video conference. Based on the processing, the method includes presenting a graphical element on at least one display. The graphical element is generated based on the audio data and/or the image data.

Thus, in certain examples the audio data may include a transcript of speech of at least part of the video conference and/or audio of at least part of the video conference. In these examples, if desired the graphical element may include a digital drawing board that may be presented based on the audio data indicating a first participant audibly inviting digital drawing board use.

In addition to or in lieu of the foregoing, also in some examples the graphical element may include an interactive poll with more than two selectable options. The interactive poll may be dynamically-generated by the at least one device based on the audio data indicating a first participant as audibly presenting at least one option of the more than two selectable options to at least second and third participants.

Still further, in certain examples the image data may also include a digital document shared with plural participants as part of the video conference.

In still another aspect, at least one computer readable storage medium (CRSM) that is not a transitory signal includes instructions executable by at least one processor to process data related to a video conference, where the data may include audio data associated with the video conference and/or image data associated with the video conference. Based on the processing, the instructions are executable to dynamically generate a graphical element based on content of the data and control at least one display to present the graphical element.

In certain examples, the graphical element may include an interactive graphical user interface (GUI) through which one or more participants of the video conference can provide input based on a question that is audibly posed by a first participant and identified by the at least one processor.

The details of present principles, both as to their structure and operation, can best be understood in reference to the accompanying drawings, in which like reference numerals refer to like parts, and in which:

DETAILED DESCRIPTION

Among other things, the detailed description below discusses use of a software agent to parse audible speech (and/or available live transcription) as well as presented visual content to offer dynamic content options during a video conference or other digital meeting. Natural language processing triggers may therefore be preset and surfaced to the presenter in real-time.

As an example, if the presenter audibly says "Who thinks this is a good idea?" or "Who is for this?" or "Who likes this?" or "Who is ready?", this would result in a binary yes/no decision poll that the presenter could opt to show others after being auto-generated by the system, or that could popup as a notification on each participant's own screen with suggested reaction buttons without first prompting the presenter themselves.

As another example, if any conference participant audibly says "Let's whiteboard this", detection of this natural language may trigger a whiteboard session option.

As yet another example if one of the attendees said "So which one of these options do you like best?", this may instigate a screen-scrape of visual content to auto-generate a multi-option poll.

Furthermore, note that while a certain number of presets may be available (e.g., as configured by a system developer or manufacturer), an end-user may also generate custom triggers during the creation of the content they plan to share during a future meeting or at another time. Thus, the triggers may be specific to the individual end-user's speech mannerisms and/or may be unique to the content that will be shared as part of a video conference.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
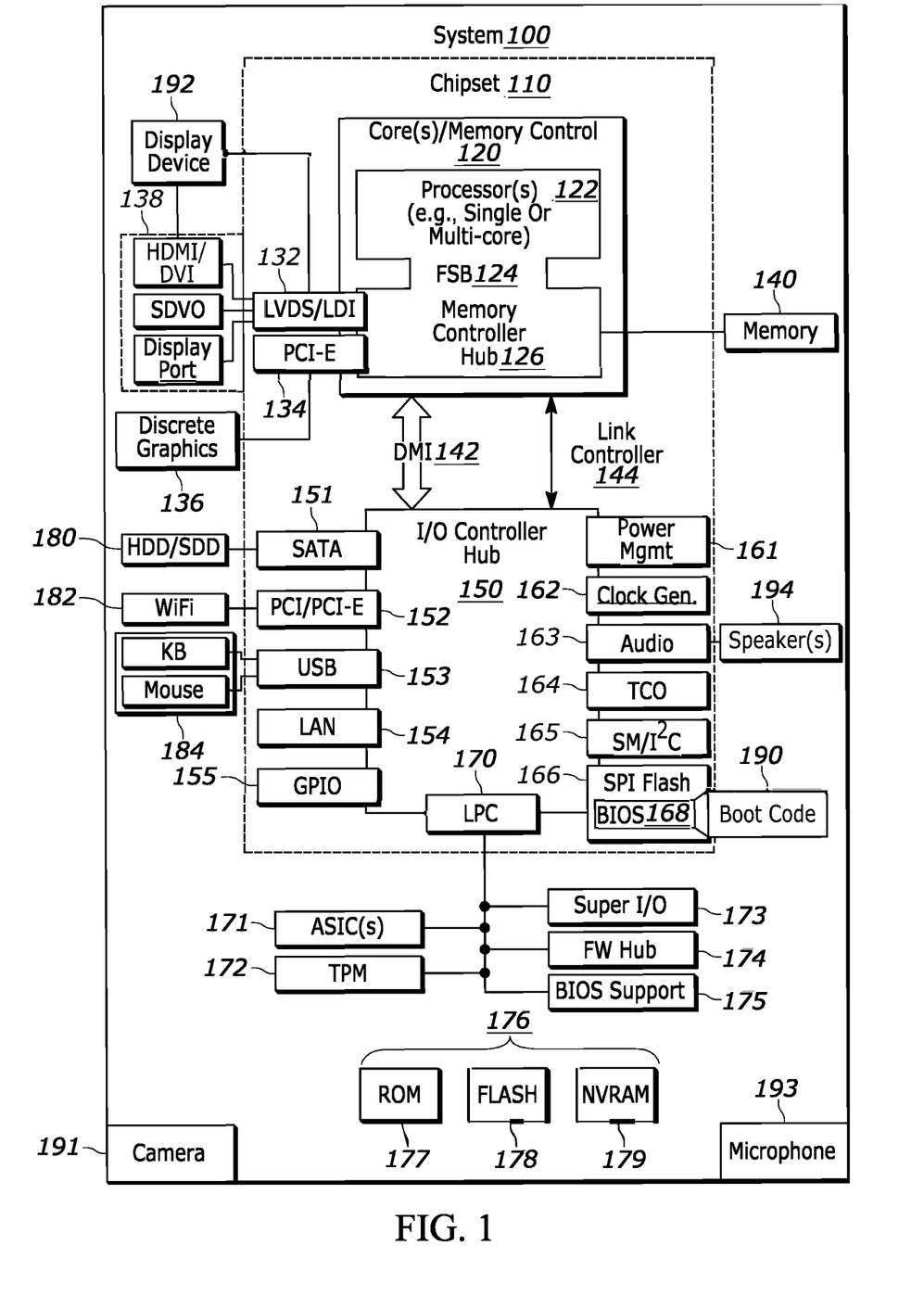
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include an audio receiver/microphone 193 that provides input from the microphone 193 to the processor 122 based on audio that is detected, such as via a user providing audible input to the microphone as part of a video conference and for other purposes. The system 100 may also include a camera 191 that gathers one or more images and provides the images and related input to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather still images and/or video for video conferencing and other purposes.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
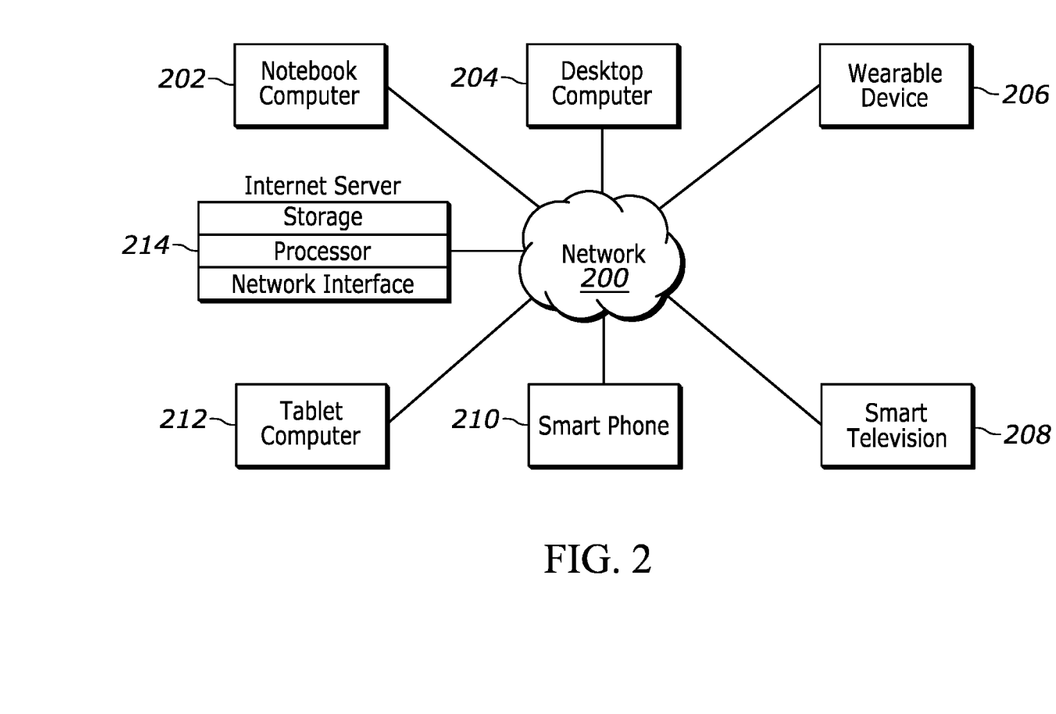
FIG. 2 is a block diagram of an example network of devices consistent with present principles.

Turning now to FIG. 2, example devices are shown communicating over a network 200 such as the Internet in accordance with present principles such as for video conferencing. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212 and route communications between the other devices 202-212 as part of video conferencing (e.g., routing audio/video feeds and metadata). It is to be understood that the devices 202-214 may be configured to communicate with each other over the network 200 to undertake present principles.

Figure 3:
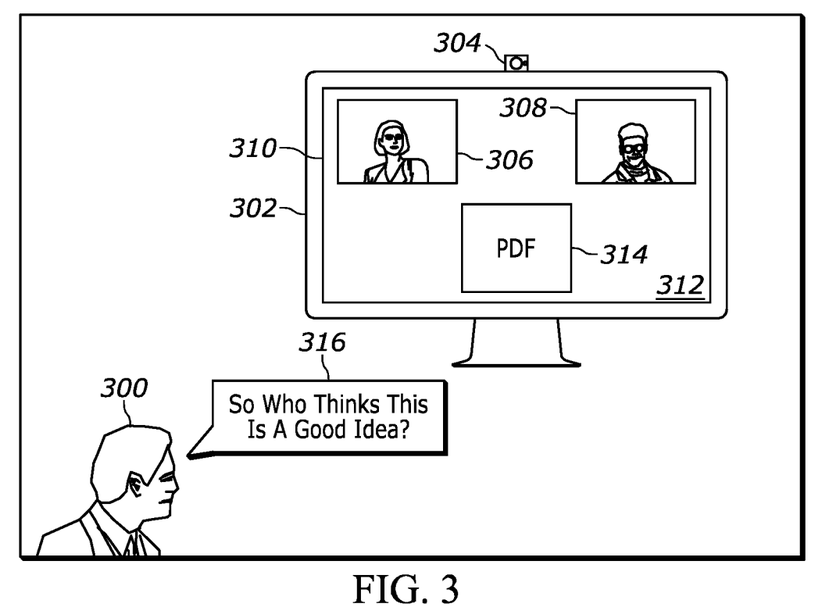
FIG. 3 shows an example illustration of a person asking a question to others as part of a video conference.

Turning now to the illustration shown in FIG. 3, suppose a participant 300 of a video conference is a presenter, leader, or organizer of the video conference and is using a desktop computer 302 to participate in the video conference. As shown, the computer 302 may include one or more sensors 304 such as a camera for generating a real time video stream of the participant 300 and a microphone for generating a real time audio stream of the participant 300 speaking so that both the video and audio streams can be routed in real time to one or more remotely-located participants for presentation at their own respective client devices. Respective audio and video streams from the remotely-located participants may also be presented locally at the computer 302 as part of the video conference for the participant 300 to hear and see the remotely-located participants.

Thus, as part of this process, video feeds 306, 308 respectively of remotely-located second and third participants may be presented on the display 310 of the computer 302 as part of a video conferencing graphical user interface (GUI) 312. As also shown in FIG. 3, a digital document 314 such as a portable document format (PDF) document, word processing document, spreadsheet, etc. may also be shared amongst the participants as part of the video conference and as such may be presented as part of the GUI 312.

Still in reference to FIG. 3, further note that as illustrated by the speech bubble 316, the participant 300 is audibly asking a question to the other participants of the video conference. In the present example, the question is whether whatever is being discussed as part of the video conference is a good idea.

Consistent with present principles, one or more of the user's own client device 302, other participant client devices, and/or a remotely-located server that is helping to facilitate the video conference may parse the audio data of the participant 300 audibly asking this question. This may include processing/parsing the actual audio of the audio stream itself using voice recognition and/or a digital assistant specifically, and/or parsing a transcript of the speech of the participant 300 once the corresponding audio has been converted to text using speech to text software and/or a digital assistant specifically. The digital assistant may be one similar to, for example, Amazon's Alexa, Google's Assistant, or Apple's Siri. Then once the participant's words have been identified (e.g., and converted to text), the words may be fed into natural language processing (NLP) software which may include natural language understanding (NLU) algorithms and others to, in turn, infer that the participant is asking a particular question as identified from the words themselves.

In some examples, the participant's audio inflections may also be analyzed to gain greater context for presentation of a graphical element as disclosed herein. For example, recognition of a person's voice raising in pitch toward the end of a statement may be used to inter the asking of a question. As such, a digital equalizer and other audio processing software may be used in combination with inferring context from the spoken words themselves using NLP.

Figure 4:
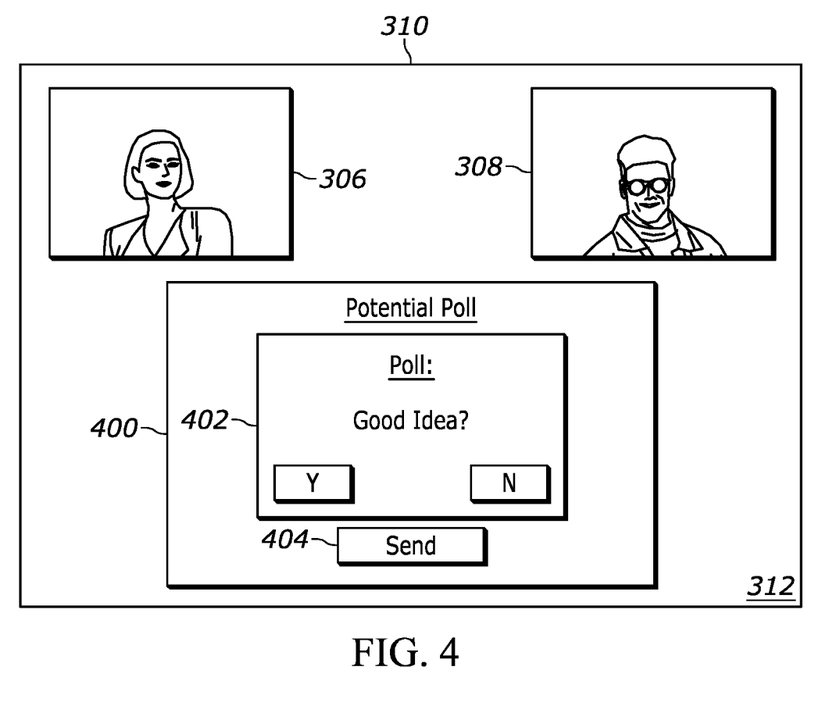
FIG. 4 shows an example graphical user interface (GUI) that may be presented at the same person's client device in response to the asking of the question, with the GUI indicating an example poll that the conferencing system generated.

Then once a question has been inferred using pitch and/or the NLP software, the question itself may form part of a dynamically-established, electronic interactive poll. FIG. 4 shows that, in some examples, the display presentation at the device 302 may change to present a prompt 400 that itself may establish its own GUI or sub-GUI. The GUI 400 may therefore be overlaid on the GUI 312, form part of the GUI 312, and/or replace one or more parts of the GUI 312. The GUI 400 may include the interactive poll 402 itself that was autonomously generated by the system based on the parsing of the spoken words of the participant 300. The GUI 400 may also include a send selector 404 that may be selected by the participant 300 using touch, cursor, or other input to then command the video conferencing system (e.g., executing at a coordinating server) to present the poll 402 on the displays of the other respective video conference participants.

Figure 5:
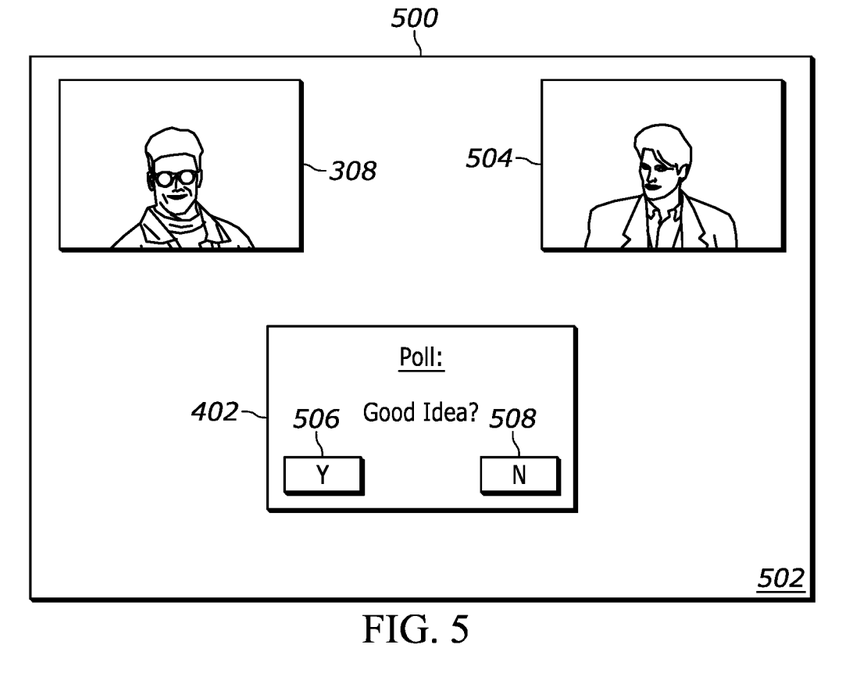
FIG. 5 shows a GUI including the poll as presented at another conference participant's client device.

FIG. 5 thus shows the interactive poll 402 as presented on a display 500 of another participant's client device as part of a video conferencing GUI 502 that is being used by that respective participant to view the video streams 308 and 504 of other participants (the stream 504 being for the participant 300). As also shown in FIG. 5, the interactive poll 402 may include a yes selector 506 and a no selector 508. The yes selector 506 may be selectable for the respective participant to respond in the affirmative to the binary choice presented through the poll 402, while the no selector 508 may be selectable for the respective participant to respond in the negative to the binary choice presented through the poll 402. In some examples, once responses to the poll 402 have been received from each participant and/or after a threshold response time has elapsed from initial presentation of the poll 402, the conferencing system may tally the affirmative and negative responses and present poll results as yet another GUI for the video conference. For example, the tally may indicate a particular number of "yes" votes and a particular number of "no" votes.

Figure 6:
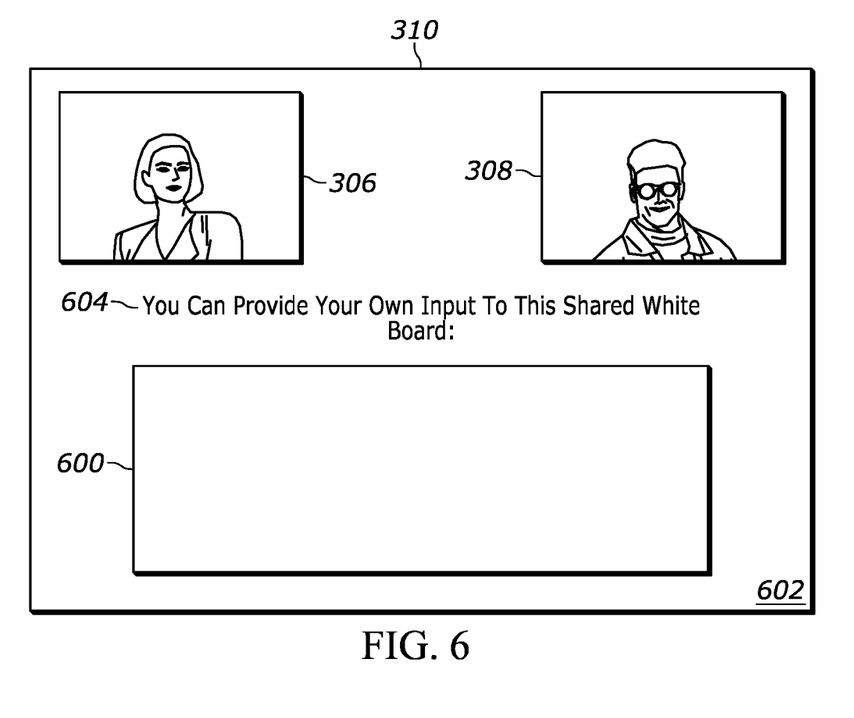
FIG. 6 shows another example GUI that may be generated by a conferencing system based on available audio and/or visual content, with this GUI showing a digital whiteboard.

FIG. 6 shows another example consistent with present principles. Here, assume one of the video conference participants audibly spoke "let's whiteboard this" as picked up by the conferencing system itself as described herein (e.g., using voice recognition and NLP). This in turn may instigate the conferencing system to dynamically present an interactive, digital drawing board 600 on each participant's display as part of a respective video conference GUI being used at that respective device for the conference. Thus, a GUI 602 is shown in FIG. 6 as being presented on the display 310 as an example, with the GUI 602 including the drawing board 600.

The drawing board 600 itself may be a digital whiteboard, digital blackboard, or other digital drawing board at which drawings, handwriting, etc. may be received as provided by conference participants using a stylus, finger, mouse, or other input object. In some examples, the GUI 602 (and other respective conference GUIs presented at the other client devices) may even include instructions 604 prompting the respective participant that the participant may provide input to the shared drawing board 600 to draw on the drawing board 600. The system may then share visual representations of the drawing input as received from that participant with the other participants on their own respective views of the board 600. Thus, even though the participants may not be at the same geolocation with each other, the conferencing system may autonomously generate and present a digital drawing board that is concurrently controllable by some or all participants in real time to seamlessly collaborate and share drawing board markings across a common virtual space.

Figure 7:
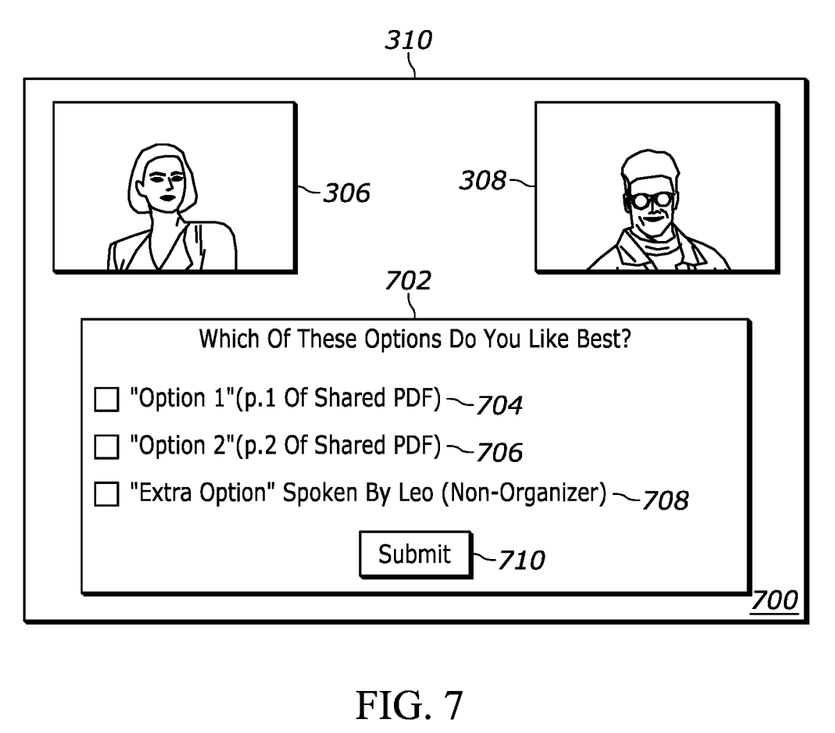
FIG. 7 shows yet another example GUI that may be generated by a conferencing system to present a non-binary poll to conference participants.

FIG. 7 shows yet another example. Here a video conference GUI 700 as presented on the display 310 of the device of the presenter 300 presents yet another interactive poll 702. According to this example, the poll 702 may be presented on the display of each client device being used for conferencing responsive to detecting a participant named Leo as audibly posing a question that asks the other conference participants which option from amongst the ones the participants were discussing is preferred by each participant.

Also according to this example, in addition to using voice recognition and NLP to identify Leo as asking a question as to which option the other participants prefer, the conferencing system may infer the corresponding potential poll answers/responses to include based on both audio data and image data for the video conference. For example, screen scraping software and/or optical character recognition (OCR) may be executed on one or more images of the video conference, such as portions of a digital document that is being visually shared as part of the video conference. The text produced by the OCR may then be parsed using NLP and/or keyword recognition to distinguish different sections of the document and/or infer at least some of the "options" referenced by Leo. For example, the system may identify different sections of the document as having different themes, topics, or characteristics corresponding to different potential options, or even having various keywords such as "option" that might correspond directly to words from Leo's speech. Thus, the NLP might employ topic segmentation, keyword recognition, argument mining, etc. to do so. Also note that if the document was, for example, an email or word processing document, the text itself may be accessed from the corresponding file itself without having to execute OCR to generate the text.

Continuing with this example, also suppose Leo audibly spoke about another option to which his question pertains, but that this option is not reflected in the digital document that is being shared. Notwithstanding being absent from the document itself, the system may execute voice recognition, NLP, keyword recognition, etc. to infer this additional option from past portions of Leo's speech (e.g., upon determining that the theme, topic, or characteristic of that portion of the speech does not correspond to any of the options identified from the digital document itself, but still does correspond to a potential response to Leo's question).

Accordingly, based on the options inferred from both the image data and audio data, each client device may be controlled by the system to present the poll 702 with selectable options 704, 706, and 708. According to this example, each option 704-708 may be selected by directing touch or cursor input to the respective check box shown adjacent to the respective option.

As shown in FIG. 7, options 704, 706 are each labeled with text taken directly from headings of the digital document itself. For example, two headings might each include the "option" keyword spoken by Leo. E.g., one heading might read "Option 1" and another heading might read "Option 2". The text for each respective option 704, 706 may also include a source from which the option itself was inferred, which for both of the options 704, 706 is a particular page number of the digital document that is being shared (a PDF document in this case).

As for the option 708, it may be labeled with particular text identified from some of Leo's audibly-spoken words, if desired. However, in this example the conferencing system by default has simply labeled the option 708 as "extra option". Also note that here too the text for the option 708 may indicate a source from which the option 708 was inferred, which here includes words audibly spoken by Leo, as well as a conference role of the source. Here the role is merely indicated as a non-organizer of the video conference, but note that job titles, specialties, affiliated organizations, and other types of roles may also be indicated.

Then once the respective participant (participant/organizer 300 in this case) selects one of the options 704-708, the participant may select the submit selector 710 to transmit the participant's selection to the conferencing system, which may ultimately tally and present the total number of selections of each option from the poll 702 as poll results as part of the video conference.

Figure 8:
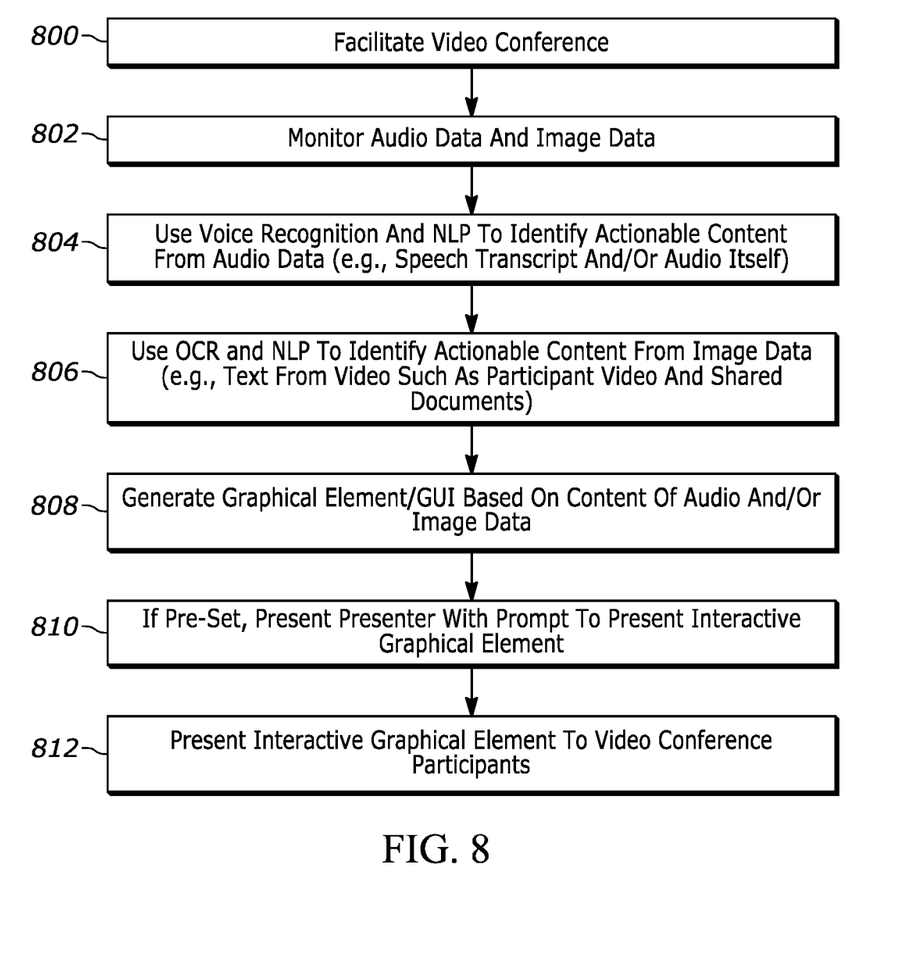
FIG. 8 illustrates example logic in example flow chart format that may be executed by a device/conferencing system consistent with present principles.

Continuing the detailed description in reference to FIG. 8, it shows example logic that may be executed by one or more devices, such as the system 100, in accordance with present principles. Thus, note that one or more of the steps in the logic below may be executed by one or more client devices and/or coordinating servers in any appropriate combination. Also note that while the logic of FIG. 8 is shown in flow chart format, other suitable logic may also be used.

Beginning at block 800, the device may facilitate a video conference by transmitting A/V content and conference metadata between conferencing devices, such as a client device transmitting its local A/V data to others and receiving the A/V data of other attendees for local presentation. Or at block 800 a coordinating server may route A/V communications between client devices, control one or more conferencing-related GUIs as presented locally at the client devices of the respective attendees, etc. From block 800 the logic may then proceed to block 802.

At block 802 the device may receive and monitor both audio data and image data as disclosed herein. The device may thus parse the audio data at block 804 using voice recognition, NLP, and other software consistent with present principles to identify actionable content from the audio data, which again may include a text transcript of speech and/or the audio itself. What constitutes actionable content may be pre-set by a device manufacturer, video conference software provider, system administrator, conference organizer, or other person. For example, questions for which polls may be provided may be pre-set as actionable content that will ultimately instigate the system to present interactive polls as described herein. As another example, reference to the keyword of a "whiteboard" may be pre-set as actionable content that will instigate the system to present an interactive drawing board for the different participants to all mark up a same virtual space reflected by the drawing board.

From block 804 the logic may then proceed to block 806. At block 806 the device may parse the image data using OCR, NLP, and other software consistent with present principles to identify actionable content as described above but this time from the image data. For example, the actionable content may be identified from text in video such as participant video (e.g., where the participant is holding up a notepad or sign) and/or text from shared digital documents. Also note that in some examples, text from text chat that is occurring in a chat window as part of the video conference may also be parsed for actionable content and/or content to include in the graphical element itself. From block 806 the logic may then proceed to block 808.

At block 808 the device may then generate a graphical element/GUI that is specifically tailored based on the content of the audio and/or image data as described herein. For interactive polls, in some examples a non-binary poll template may be accessed and then the relevant text for each option may be filled in by the device based on the content identified through NLP, etc. to generate the dynamic graphical element that ultimately gets presented (e.g., with excess poll options from the template being omitted altogether). Or a generic "yes/no" binary poll template may be adopted and auto-filled with the question itself that was posed by one of the participants to then present the dynamic poll to the participants.

As another example, for drawing boards, a default, blank drawing board may be generated based on identifying the keyword of "whiteboard" along with a verbal invitation to participate in the verb of "whiteboarding", "drawing", "providing", etc. Or as another example, a default drawing board may be auto-populated with a topic header based on a topic identified as being spoken about or indicated in a digital document that is being shared so that drawings and notes may then be added underneath the topic header on the drawing board. Or a drawing or image from the digital document itself may be copied to the drawing board so that the participants may add to it via the drawing board. Then once input is complete or even as input is provided in real time, the system might also alter the drawing as appearing in the digital document itself based on the alterations made to it though the drawing board.

The logic may then proceed to block 810 where, if the device/system has been pre-set to do so, the device may present the video conference's organizer, presenter, etc. with a prompt like the prompt 400 regarding whether to present the generated interactive graphical element itself. Then at block 812 the device may present the graphical element responsive to receiving an affirmative response to the prompt. Further note however that if a negative response is received instead, the device may in response disregard/dump the graphical element from being maintained in memory like RAM or persistent storage where it might have been stored upon being generated.

However, in other example implementations the logic may proceed from block 808 directly to block 812 without prompting the organizer first. At block 812 the logic may actually present the generated interactive graphical element to video conference participants. Thus, should the pre-set to prompt the organizer not be enabled, the graphical element may be autonomously generated and presented to each conference participant without the presenter providing additional consent to present the graphical element beyond possibly audibly posing the choice himself or herself.

Figure 9:
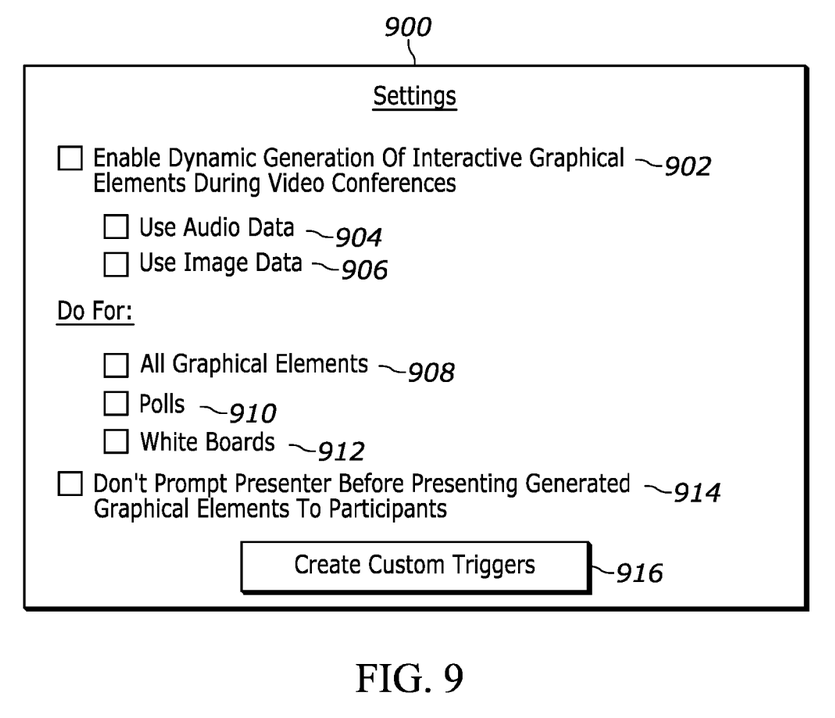
FIG. 9 shows an example GUI that may be presented on a display for configuring one or more settings of a device/conferencing system to operate consistent with present principles.

Now in reference to FIG. 9, it shows an example settings graphical user interface (GUI) 900 that may be presented on a display of a client device or even display of a server to configure one or more settings of a conferencing system, service, or software consistent with present principles. For example, the GUI 900 may be presented on a display of the device undertaking the logic of FIG. 8, a display of an end-user's own client device, and/or the display of a system administrator's device.

The settings GUI 900 may be presented to set or enable one or more settings of the device or conferencing system to operate consistent with present principles. For example, the GUI 900 may be reached by navigating a main settings menu of the device or its operating system, or a settings menu of a particular video conferencing software application that may be used for video conferencing as disclosed herein. Also note that in the example shown, each option or sub-option discussed below may be selected by directing touch or cursor input to the respective check box adjacent to the respective option.

Accordingly, as shown in FIG. 9, the GUI 900 may include an option 902 that may be selectable a single time to set or configure the device, system, software, etc. to undertake present principles for multiple future conferences, such as executing the functions described above in reference to FIGS. 3-7 and executing the logic of FIG. 8 for different video conferences in the future.

The GUI 900 may also include a sub-option 904 that may be selectable to set the device to specifically or only use audio data for determining whether to present an interactive graphical element. Likewise, a sub-option 906 may also be included on the GUI 900 and may be selectable to set the device to specifically or only use image data for determining whether to present an interactive graphical element.

If desired, in some examples the GUI 900 may also include various options 908, 910, and 912 to select particular interactive graphical elements to present during video conferencing (option 910 for polls and option 912 for drawing boards), or to set the device to present any graphical element determined to be appropriate for a given situation (option 908).

As also shown in FIG. 9, the GUI 900 may further include an option 914 that may be selectable to specifically set or enable the system/device to not prompt an organizer, presenter, or other person posing a question before a corresponding interactive graphical element is presented to other participants of the same video conference. For example, selection of option 914 may result in the logic of FIG. 8 proceeding from block 808 to block 812 without executing block 810.

Still further, in various example implementations the GUI 900 may also include a selector 916. The selector 916 may be selectable to initiate a setup process for a user to enter one or more triggers as custom pre-sets through another GUI. For example, the user may specify specific questions that, when asked, would present a poll.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   storage accessible to the at least one processor and comprising instructions executable by the at least one processor to:
   parse data related to a video conference, the data comprising one or more of: audio data for the video conference, image data for the video conference; and
   based on the parsing, present a graphical element on at least one display, the graphical element generated based on one or more of: the audio data, the image data;
   wherein the image data comprises one or more images associated with the video conference, the one or more images being presented to participants of the video conference as part of video for the video conference;
   wherein the graphical element comprises an interactive poll with at least two selectable options, the interactive poll being dynamically-generated by the at least one processor based on the one or more images indicating at least two choices to reflect in the interactive poll; and
   wherein the at least one processor dynamically-generates the interactive poll based on execution of optical character recognition (OCR) using the one or more images to identify text from the one or more images, and based on execution of natural language processing (NLP) to process the text to generate at least one of the selectable options.

2. The device of claim 1, wherein the audio data comprises one or more of: a transcript of speech of at least part of the video conference, audio of at least part of the video conference.

3. The device of claim 2, wherein the instructions are executable to:
   use natural language processing (NLP) to parse one or more of: the transcript, the audio.

4. The device of claim 2, wherein the interactive poll is dynamically-generated by the at least one processor based on the audio data indicating a first participant audibly presenting a question to at least second and third participants, the interactive poll reflecting the question.

5. The device of claim 4, wherein the at least two choices reflect a binary choice, and wherein the interactive poll comprises two options reflecting the binary choice.

6. The device of claim 4, wherein the instructions are executable to:
   present, to the first participant, a prompt to present the interactive poll to the second and third participants;
   receive user input directed to the prompt to present the interactive poll to the second and third participants; and
   responsive to receipt of the user input, present the interactive poll to the second and third participants via respective displays for the second and third participants.

7. The device of claim 6, wherein the prompt comprises the interactive poll itself.

8. The device of claim 4, wherein the instructions are executable to:
   without the first participant providing additional consent to present the interactive poll beyond audibly presenting the question, present the interactive poll to the second and third participants.

9. The device of claim 1, comprising the at least one display.

10. The device of claim 1, wherein the device comprises one or more of: a server facilitating the video conference, a client device being used to participate in the video conference.

11. The device of claim 1, wherein the graphical element comprises a digital drawing board, the digital drawing board being presented based on the audio data indicating a first participant audibly inviting digital drawing board use.

12. A method, comprising:
   processing, using at least one device, data related to a video conference, the data comprising one or more of: audio data associated with the video conference, image data associated with the video conference; and
   based on the processing, presenting a graphical element on at least one display, the graphical element generated based on one or more of: the audio data, the image data;
   wherein the graphical element comprises a digital drawing board, the digital drawing board being presented based on the audio data indicating a first participant audibly inviting digital drawing board use.

13. The method of claim 12, wherein the audio data comprises one or more of: a transcript of speech of at least part of the video conference, audio of at least part of the video conference.

14. The method of claim 13, wherein the graphical element comprises an interactive poll with at least two selectable options, the interactive poll being dynamically-generated by the at least one device based on the audio data indicating a first participant as audibly presenting at least one option of the at least two selectable options to at least second and third participants.

15. The method of claim 12, wherein the image data comprises a digital document shared with plural participants as part of the video conference.

16. The method of claim 12, wherein the graphical element comprises a poll generated based on execution of optical character recognition (OCR) using the image data to identify text from the image data, and based on execution of natural language processing (NLP) to process the text to generate selectable options to include as part of the poll.

17. At least one computer readable storage medium (CRSM) that is not a transitory signal, the at least one computer readable storage medium comprising instructions executable by at least one processor to:

process data related to a video conference, the data comprising one or more of: audio data associated with the video conference, image data associated with the video conference;

based on the processing, dynamically generate a graphical element based on content of the data; and control at least one display to present the graphical element;

wherein the graphical element comprises an interactive graphical user interface (GUI) through which one or more participants of the video conference can provide input based on a question that is audibly posed by a first participant and identified by the at least one processor.

18. The CRSM of claim 17, wherein the graphical element comprises a digital drawing board, the digital drawing board being presented based on the audio data indicating a first participant audibly inviting digital drawing board use.

19. The CRSM of claim 17, wherein the at least one processor generates the interactive GUI based on execution of optical character recognition (OCR) using the image data to identify text from the image data, and based on execution of natural language processing (NLP) to process the text to generate at least one selectable option to include as part of the interactive GUI.

20. The CRSM of claim 17, comprising the at least one processor.

* * * * *